United States Patent [19]

Marks

[11] Patent Number: 4,617,483
[45] Date of Patent: Oct. 14, 1986

[54] ELECTROTHERMODYNAMIC POWER CONVERTER WITH CONVERGING FLOWS

[76] Inventor: Alvin M. Marks, 359R Main St., c/o Ardi, Athol, Mass. 01331

[21] Appl. No.: 574,374

[22] Filed: Jan. 27, 1984

[51] Int. Cl.⁴ .............................................. H02N 1/00
[52] U.S. Cl. ........................................ 310/10; 310/11
[58] Field of Search ................... 310/10, 11, 308, 309, 310/300

[56] References Cited

U.S. PATENT DOCUMENTS

| | | | |
|---|---|---|---|
| 3,443,129 | 5/1969 | Hammitt | 310/11 |
| 3,449,601 | 6/1969 | Tipton | 310/11 |
| 3,648,083 | 3/1972 | Low | 310/11 |
| 3,878,410 | 4/1975 | Petrick et al. | 310/11 |
| 3,980,907 | 9/1976 | Nakamura | 310/11 |
| 4,395,648 | 7/1983 | Marks | 310/10 |
| 4,523,112 | 6/1985 | Marks | 310/10 |

*Primary Examiner*—Donovan F. Duggan

[57] ABSTRACT

An electrothermodynamic generator and a compressor is described for use in a Marks/Ericsson Cycle. It uses a charged liquid tin droplet/nitrogen aerosol for heat/electric conversion at a maximum temperature of about 1800 K and a charged water droplet/nitrogen aerosol electrothermodynamic compressor at 300 K in a Marks/Ericsson Cycle which has a theoretical efficiency of 83%, and a practical efficiency of 60% to 70%. An ETD compressor with a water charged droplet is described. The other cycle components, comprising a heat source, liquid tin loop, heat exchangers, water loop and liquid pump are not here considered.

18 Claims, 3 Drawing Figures

ELECTROTHERMODYNAMIC POWER CONVERTER WITH CONVERGING FLOWS

1. FIELD OF THE INVENTION

This invention relates to an electrothermodynamic generator with converging gas and charged aerosol flows. Compared to prior art devices, the present invention enables the direct conversion of the thermal power of a gas aerosol to electric power, at several orders of greater magnitude of electric power and current, at about the same voltage, and in the same volume.

2. BACKGROUND OF THE INVENTION

A comprehensive background and bibliography in the field of this invention has previously been given.[1] This invention results from further studies in connection with Methods III.[2,2.1] and IV.[1]

3. IN THE FIGURES

4. DESCRIPTION OF THE INVENTION

Figure 1:
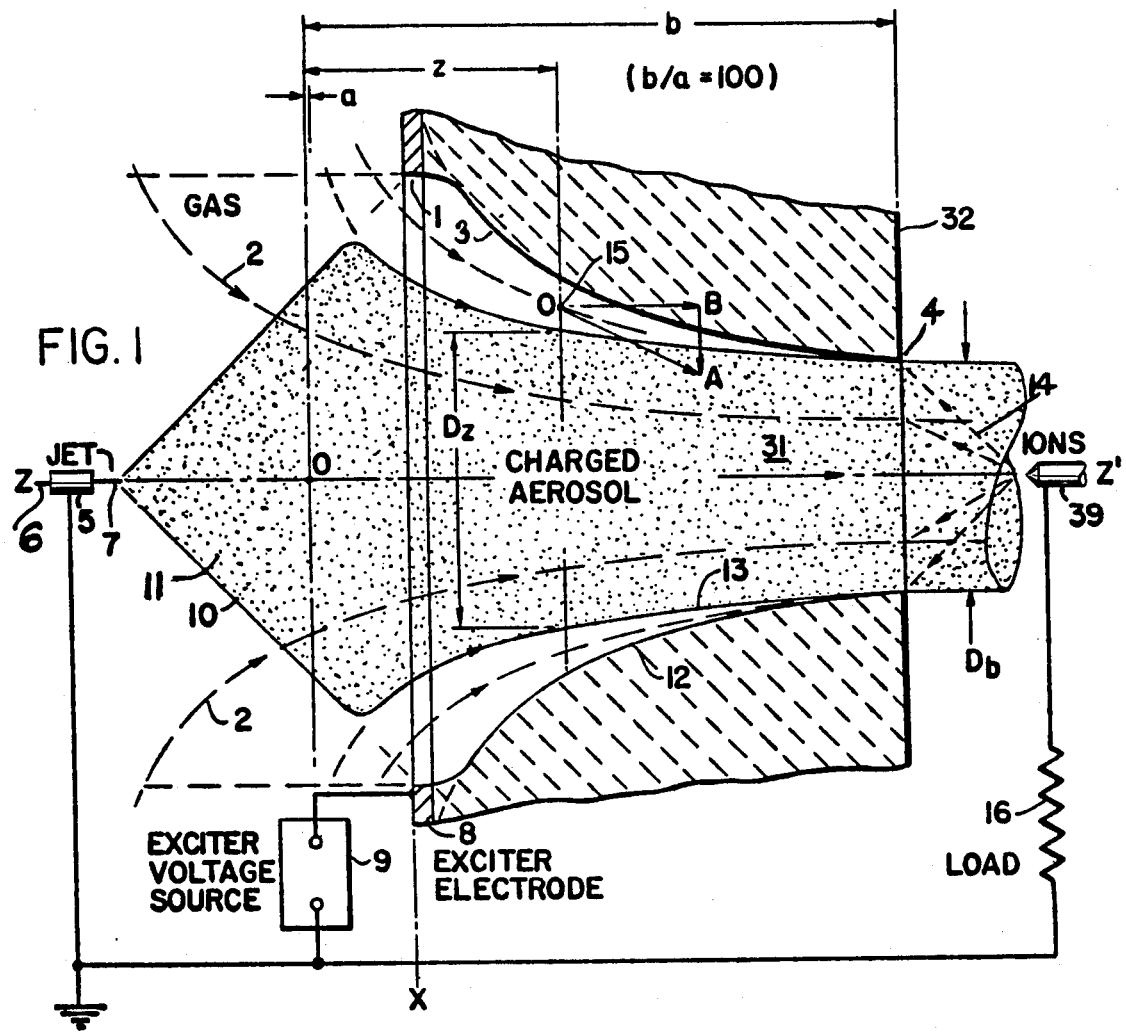
FIG. 1 shows a cross section of an electrothermodynamic generator of this invention and a diagram of the electrical connections, showing the outer curve for the surface of the converging duct, and the inner curve for the surface of the charged aerosol within the flowing gas in the duct.

In FIG. 1, there is shown a straight duct 1, which contains a flowing gas 2 which passes into a converging duct 3, and thence through an orifice 4. A small diameter tube 5 within the duct 1 contains a flowing conductive liquid 6 such as molten tin, Wood's metal, mercury, water, an alcohol, etc. which issues as a liquid jet 7. An exciter electrode 8 is located at the entrance to the converging duct 3. A voltage source 9 is connected across the exciter electrode, and the tube 5, applying an electric field between the jet 7 and the exciter electrode 8. As a consequence the liquid jet breaks into a large number of small diameter charged liquid droplets, thus forming a charged aerosol at the entrance to the converging duct 3, which has a diameter $d_a$ less than the diameter $D_a$, at z=a. The converging duct 3 converges along a first or outer surface along an outer curve 12. The charged aerosol expands to a smaller diameter $d_a$ at z=a, and converges along a second or inner surface, which nests within the said first surface. The converging gas stream line has a velocity vector OA, which is resolved into an axial vector velocity component OB, and a normal vector velocity component AB directed towards the z axis. The normal velocity vector AB causes the charged aerosol to be centrally confined, and to be pinched around the axis within the duct; and to remain separated from the wall of the duct 3. This prevents the wall from being wetted by the liquid, and prevents "shorting" the charged aerosol potential difference via the walls of the duct. By this means, the gas and the charged aerosol are "uncoupled". The gas flow is consistent with the continuity laws, the charged aerosol is subjected to the velocity increase along the z axis provided by the flowing gas, but is contained within a different or inner surface envelope suitable for maximum power conversion. A further discussion of the invention will follow the Mathematical Physics Section.

TABLE OF SYMBOLS

| Symbol | Description | Units |
| --- | --- | --- |
| A | Area | m² |
| C | Specific Heat | joules/kg |
| D | Diameter of Duct | m |
| E | Electric Field Intensity | v/m |
| I | Current | amps |
| J | Exponent of Area for the Duct Surface | |
| K | A Constant | |
| L | Length Along Conversion Space = b − a | m |
| M | Mach No | |
| N | Number | |
| P | Power | watts |
| R | Gas Constants - see constants, value of ; | a ratio |
| S | Entropy | |
| T | Temperature | °K. |
| U | Velocity | m/s |
| V | Potential, electric | volts |
| a | Distance from origin at z = a | m |
| b | Distance from origin at z = b | m |
| d | Diameter of Charged Aerosol | m |
| e | Electron Charge see constants, values of | c |
| f | A factor | |
| j | Exponent of (z/b) for cross sectional area of the charged aerosol surface | |
| k | A constant | |
| m | Mass | Kg |
| n | Exponent of (z/b) for velocity | |
| p | Pressure | N/m² |
| r | Radius | |
| z | A distance along the flow axis from the origin | m |
| $\nu$ | Volume | m³ |
| $\alpha$ | $\dot{m}_a/\dot{m}_g$ ratio of liquid droplet mass flow rate to the gas mass flow rate | |
| $\delta$ | Density | Kg/m³ |
| $\delta_r$ | Relative density, a ratio $\delta/\delta_1$ at 273° K. | |
| $\gamma$ | Ratio of specific heats $c_p/c_v$ for gas | |

TABLE OF SYMBOLS-continued

| | Description | Units |
|---|---|---|
| $\rho$ | Electric charge density | c/m$^3$ |
| $\eta$ | Efficiency | |
| $\zeta$ | Electric field ratio (E/Ec) at incipient breakdown | |
| $\Omega$ | Molecular weight | |
| $\chi$ | Voltage ratio Ea/Ec | |
| $\bar{\chi}$ | $\chi/\zeta$ voltage ratio maximum | |
| $\bar{\Gamma}$ | $\chi/\zeta^2$ power ratio maximum | |
| $\Delta$ | Increase or decrease of a value | |

SUBSCRIPTS

| | |
|---|---|
| L | Length |
| Q | Heat |
| a | The distance z = a along conversion space z axis from origin |
| b | The distance z = b along conversion space z axis from origin |
| c | Referring to same variable computed for a constant area duct, constant velocity for electric field, voltage, current and power |
| d | Duct |
| e | Electric or Electron |
| g | Gas |
| k | Kinetic |
| o | Droplet |
| p | Pressure |
| r | Relative value |
| s | Sonic |
| v | Volume |
| 1 | Air; at standard conditions, 273K and 1 atmos. = 1.01 × 10$^5$ N/m$^2$ |

SUPERSCRIPTS

| | |
|---|---|
| • | Time Rate |
| — | Maximum value. When used thus $\bar{\chi}$, $\bar{\Gamma}$ these ratios are the values at incipient electric breakdown resulting from a $\eta$ increase in the current by the ratio 1/$\zeta$. |

CONSTANTS, VALUES OF:

| | | |
|---|---|---|
| $K_e$ | $\frac{1}{2}(\epsilon_o b_1^2)(\Omega_1/\delta_1)[1/273 \times 8314)] = 4.00 \times 10^{-4}$ a constant of the electric power conversion equation | |
| $\epsilon_o$ | 8.854 × 10$^{-12}$ dielectric constant of space | f/m |
| $\delta_1$ | 1.273 density of air at 273K and 1 atm | Kg/m$^3$ |
| $b_1$ | 3 × 10$^6$ electric breakdown field at 273K and 1 atmos., of air. | U/m |
| $\Omega_1$ | 28.97 average molecular weight of air | |
| R | 8314/$\Omega$ gas constant | joules/Kg K°mol |
| e | 1.601 × 10$^{-19}$ electric charge of the electron | C |
| $\eta_k$ | $1 - (U_a/U_b)^2$ Kinetic power change in conversion space as a fraction of the output kinetic power | |

6. MATHEMATICAL PHYSICS

6.1 Differential Equation of the Conversion Space

The generalization of the earlier equations[3] involved the use of a differential form of Gauss' equation in which the charge density p varies from z=a to z=b:

$$d/dz(AdV/dz) = -A\rho/\epsilon_o \quad (1)$$

in which the conversion space is between z=a and z=b, and $$A_z \equiv A_a(z/a)^j \quad (2)$$

$$U_z \equiv U_a(z/a)^n \quad (3)$$

$$p_z = I/A_z U_z = (I/A_a U_a)(z/a)^{-(n+j)} = \rho_a(z/a)^{-(n+j)} \quad (4)$$

The differential equation obtained from (1)–(4) inclusive and to be solved is:

$$d/dz[(z/a)^j(dV/dz)] = -\rho_a(z/a)^{-n} \quad (5)$$

6.2 The Electric Field and the Current Ratio

The equation (5) is integrated subject to $E=dV/dz=0$ at $z=b$ The equation for E is compared for various values of j and n to the Electric Field intensity $E_a$ at z=a, the entrance to the conversion space, using the equation for $E_c$ derived in the prior art[4], for a constant velocity gas in a constant area duct.

$$E_c = -\rho L/\epsilon_o = IL/\epsilon_o UA \quad (6)$$

$$E_b = b_1 K_a \delta_r = E_c = \bar{I}L/\epsilon_o UA \quad (6.1)$$

An electric field intensity ratio $\zeta_a$ at z=a is derived:

$$\zeta_a \equiv E/E_c = \frac{1}{(1-n)[(b/a)-1]}[(b/a)^{1-n} - 1] \quad (7)$$

For U increasing, n>1 and for (b/a)>>1, the numerator and equation (7) may be approximated:

$$\zeta_a = \frac{1}{(n-1)}\left(\frac{a}{b}\right) \quad (8)$$

and the field ratio $\zeta_a$ is small and large currents can be sustained without electric breakdown.

For the charged aerosol velocity decreasing n is negative $\eta<0$ and the approximation is $$\zeta_a = \frac{1}{1-n}(b/a)^{-n} \quad (9)$$

and here the field ratio $\zeta_a$ is large.

Hence it is preferred to use the conditions for (8). From (6.1) the maximum current $\bar{I}$ is limited by the breakdown field $E_b=\bar{E}_c$. According to Equation (7) the electric field intensity at z=a is decreased by an increased velocity gradient, that is for a positive value of $\eta$. Therefore according to (6.1) the current may be increased inversely as the ratio $1/\zeta$. Hence the maximum current ratio is $1/\zeta$, which, from (8) is $$1/\zeta=(\eta-1)(b/a) \quad (10)$$

The value of n should be as large as possible but it is limited to attainable values of the ratio of the velocity at the exit plane to the velocity at the entrance plane of the conversion space; that is $(U_b/U_a)\approx 1000$; for a useful ratio of the distance b to the distance a; that is $(b/a)\approx 100$. The useful maximum value of n is then from (3):

$$\eta=\ln(U_b/U_a)/\ln(b/a)=1000/\ln 100=1.5 \quad (11)$$

From (3) and (10) the current ratio is:

$$1/\zeta=(\eta-1)(U_b/U_a)^{1/\eta} \quad (12)$$

For $(U_b/U_a)=1000$ the maximum value of $1/\zeta$ at $\eta=1.2$ is: 63.10. Putting n=1.2 and $(U_b/U_a)=1000$ in (11), and solving for $$(b/a)=1\eta^{-1}(1/1.2)\ln 1000=316 \quad (13)$$

The electric field intensity ratio $\zeta$ varies with (z/b) according to an equation derived from (5) by integration subject to the condition E=0 at $(z/b)=1$ $$\zeta = \left\{\frac{1}{(n-1)[(b/a)-1]}(b/a)^{1-n-j}\right\}\left(\frac{z}{b}\right)^{-j}\left[1-\left(\frac{z}{b}\right)^{1-n}\right] \quad (14)$$

This equation has a maximum value $\bar{\zeta}$ for $j=-\eta$, but not for $\eta+j\cong 1$. If there is a maximum ratio $\zeta$ then its value and position is respectively given by (14) and (15):

$$\bar{\zeta}=(\bar{E}/E_o)=\frac{1}{[(b/a)-1]}\left[\frac{(-j)^{-j}}{(1-n-j)^{1-n-j}}\right]\left(\frac{b}{a}\right)^{1-n-j} \quad (15)$$

-continued $$\left(\frac{\bar{z}}{b}\right)=\left(\frac{-j}{1-n-j}\right)^{1/(1-n)} \quad (16)$$

and from (9) and (15) for (b/a)>>1

$$(\bar{\zeta}/\zeta_a)=(-j)^{-j}(\eta-1) \quad (16.1)$$

A maximum exists only when $\bar{\zeta}>\zeta_a$, for which $$(-j)^{-j}(\eta-1)>1 \quad (16.2)$$

For n=1.5 and $(j+n)=0.84$ in which case there is no maximum $\bar{\zeta}$.

However maxima do exist for cases where the continuity condition implies $\gamma\approx-\eta$ in which case $$(\eta-1)(-\gamma)^{-\gamma}=(\eta-1)\eta^{\eta}>1 \quad (16.3)$$

for positive n.

6.3 The Electric Voltage and Voltage Ratio

The voltage V from z=a to z=b is obtained by a second integration of equation (5), starting with equation (14), which is the result of the first integration. The second integration is subject to the condition that V=0 at z=a.

As a basis of comparison the voltage $V_c$ across the distance $L=b-a$, for a constant area duct, with a charged aerosol at constant velocity, previously derived[4], is used:

$$V_c=YL^2/2\epsilon_0=IL^2/2\epsilon_0 Au \quad (17)$$

A voltage ratio X is defined, and derived from the second integration:

$$\chi\equiv V/V_c=\left\{\frac{2}{(1-n)[(b/a)-1]^2}\right\}\left\{\frac{\left(\frac{b}{a}\right)^{2-n-j}-\left(\frac{b}{a}\right)^{1-n}}{(1-j)}+\frac{1-\left(\frac{b}{a}\right)^{2-n-j}}{(2-n-j)}\right\} \quad (18)$$

Equation (18) simplifies for (b/a)>>1 and $\eta>1$:

$$\chi=[1/(1-j)(2-\eta-j)](a/b)^{\eta+j} \quad (19)$$

From this, it is shown that, for $\eta+j\approx 1$, and j negative for a converging charged aerosol with increasing velocity, the voltage ratio is small.

However, from (17) the current I may be increased until incipient electric breakdown by the current ratio $1/\zeta$ from equation (10); then $\bar{\chi}\equiv\chi/\zeta$ is the corresponding maximum voltage ratio. Hence from (10) and (19)

$$\bar{\chi}\equiv\chi/\zeta=[2(\eta-1)/(1-\gamma)(2-\eta-J)](b/a)^{1-\eta-\gamma} \quad (20)$$

Examples:

$$\left.\begin{array}{l} n = 1.5 \\ j + n \approx 1 \end{array}\right\} \bar{\chi} = 0.66 \text{ which is a useful result.} \quad (21)$$

$$\left.\begin{array}{l} n = 1.5 \\ j \approx -n \end{array}\right\} \bar{\chi} = 20 \text{ which is too great to be used.} \quad (22)$$

In the particular case where $n+j=1$ $$\bar{\chi} = 2(\eta - 1)/\eta \quad (23)$$

For $\bar{\chi}=1$, equation (20) requires these values:

$$\left.\begin{array}{l} n = 1.5 \\ j = -0.635 \\ j + n = 0.865 \end{array}\right\} \text{ for which } \left\{\begin{array}{l} \bar{\chi} = 1 \\ \bar{\Gamma} = 50 \end{array}\right. \quad (24)$$

For $\bar{\chi}=2$, which may be about the maximum useful value:

$$\left.\begin{array}{l} n = 1.5 \\ j = -0.85 \\ j + n = 0.65 \end{array}\right\} \text{ for which } \left\{\begin{array}{l} \bar{\chi} = 2 \\ \bar{\Gamma} = 100 \end{array}\right. \quad (25)$$

As shown in (12) a maximum current ratio is obtained $1/\zeta=63.2$ for $\eta=1.2$. However, by (23) $\bar{\chi}=\frac{1}{3}$; and so the power ratio $\bar{\Gamma}=63.2\alpha(\frac{1}{3})=21$. If the voltage ratio $\bar{\chi}$ increased to $\bar{\chi}=1$ by increasing the length by $\sqrt{3}$ then the power ratio $\bar{\Gamma}=36.4$, not as gret as in (24).

For all values of $\bar{\chi}$, $\bar{\chi}=1$, $\bar{\chi}=2$, etc. The maximum current ratio $1/\zeta$ is the same, since from (10) it depends only on the value of n. Thus if in (24) the voltage $V=50,000$ volts, in (25) the voltage is $V=100,000$ volts; the current being the same for each; but twice the power for (25), compared to (24).

6.4 The Electric Power and the Power Ratio

At incipient electric breakdown, the maximum voltage $\bar{V}$ across the converter from $z=a$ to $z=b$ occurs when the current is increased by the ratio $1/\zeta$, compared to the maximum current for the constant area, constant velocity case (6.1). The maximum power ratio is:

$$\bar{\gamma} = \bar{I}\bar{V}/I_c V_c = \bar{\chi}/\zeta^2 = \chi/\zeta \quad (26)$$

If $\bar{\chi}<1$, the length $L=(b-a)$ in (17) may be increased by $\bar{\chi}^{-\frac{1}{2}}$. This decreases the current by $\bar{\chi}^{\frac{1}{2}}$ increases the voltage to $\bar{\chi}=1$, and increases the power by $\bar{\chi}^{-\frac{1}{2}}$ Length $f_c$ increase by $\bar{\chi}^{-\frac{1}{2}}$ (27)
Current decrease by $\bar{\chi}^{\frac{1}{2}}$
Voltage increase to $\bar{\chi} = 1$
Power increase by $\bar{\chi}^{-\frac{1}{2}}$ According to (11), the maximum practical values of $(b/a)=100$ and $n=1.5$; hence the maximum power ratio for $\bar{\chi}=1$ is from (23) and (12)

$$\Gamma = 1(\eta - 1)(b/a) = 1(1.5 - 1)100 = 50 \quad (28)$$

and for $$\chi = 2$$

$$\Gamma = 100 \quad (29)$$

6.5 The Duct Surface

The duct surface contains the flowing gas which converges toward an orifice of diameter $D_b$. Applying the continuity equation:

$$mg = \delta_a U_a A_a = \delta_b U_b A_b = \delta_z U_z A_z \quad (30)$$

Substituting (2) and (3) in (30) and solving for $(\delta_a/\delta_z)$ $$(\delta_a/\delta_z) = (U_z/U_a)(A_z/A_a) = (z/a)^\eta \cdot (z/a)^J = (z/a)^{\eta + J} \quad (31)$$

when $z=b$ $$(\delta_a/\delta_b) = (z/b)^{\eta + J} \quad (32)$$

The equation of the duct surface curve in the YZ plane is derived from (2). The j is capitalized J to distinguish it from the j used with the charged aerosol surface $$(D_z/D_a)^2 = (A_z/A_a) = (z/a)^J = (b/a)^J \cdot (z/b)^J \quad (33)$$

$$D_z = [D_a(b/a)^{J/2}](z/b)^{J/2} \quad (34)$$

When $(z/b)=1$ $$D_b = D_a(b/a)^{J/2} \quad (35)$$

and since $$r_z = \frac{1}{2} D_z$$

The equation of the duct curve is:

$$r_z = r_b(z/b)^{J/2} \quad (36)$$

The velocity $U_z$ at $(z/b)$ is from (3)

$$U_z = U_a(z/a)^\eta = [U_a(b/a)^\eta](z/b)^\eta \quad (37)$$

The exit velocity is $U_b$ at $(z/b)=1$; hence $$U_z = U_b(z/b)^\eta \quad (38)$$

The velocity space gradient at $(z/b)$ is $$(dU_z/dz) = \eta(U_b/b^\eta)z^{\eta - 1} = \eta(U_b/b)(z/b)^{\eta - 1} \quad (39)$$

Example $U_b = 86$ m/s; $b = 10^{-2}$m; m = 1.5

Find $(dU_a/dz)$ at $(z/b) = 0.01, 0.25, 1$.

$(dU_z/dz) = 1.5 (86/10^{-2})(0.01)^{\frac{1}{2}} = 12.9$ m/s − m $= 1.5 (86/10^{-2})(0.25)^{\frac{1}{2}} = 6450$ $= 1.5 (86/10^{-2}) 1^{\frac{1}{2}} = 12,900$ Hence the velocity gradient increases by a factor of 10 from $z=a$ to $z=b$ for this example.

6.6 The Charged Aerosol Surface

If the charged aerosol is uniformly distributed across the duct the continuity equation (30) must be used.

Example: Given $\delta_a/\delta_b=1.5$; $b/a=100$ Find $(J+n)$ from (30)

$$J+\eta = \ln (\delta_a/\delta_b)/\ln (b/a) = 0.405/4.605 = 0.09 \quad (40)$$

and if n=1.5 then J= −1.41. Putting these value in (20) $\overline{\chi}=11.5$ which is too large; hence the surface of the charged aerosol must be separated from the duct and $j+n\approx 1$, so that $\overline{\chi}=1$ or 2.

When the surfaces of the duct and the charged aerosol are separated as shown in FIG. 1, the gas stream lines between the duct surface and the charged aerosol surface may be represented by a velocity vector, such as OA from the point 15. This vector has an axial component, and a normal component BA toward the flow axial which "pinches" and confines the charged aerosol; preventing the liquid droplets from reaching the duct wall; thus avoiding the wetting of the duct wall by the liquid, which might otherwise cause a short circuit.

Figure 2:
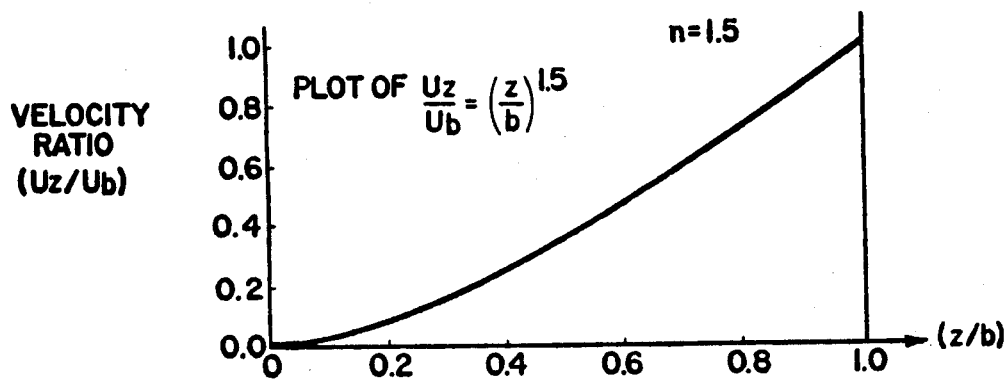
FIG. 2 shows a graph of velocity ratio ($U_z/U_b$) vs. distance ratio (z/b)

The equation of the charged aerosol surface curve is derived similarly to the derivation for the duct curve (36) using a different value of j; but with the same orifice radius $r_b$ at z=b; since the gas and the charged aerosol mix and flow through the same orifice; as shown in FIG. 2: Hence $r_{za} = r_b(z/b)^{j/2}$ (40.1)

It is a feature of this invention to utilize a major portion of the duct curve (36) and the charged aerosol curve (40.1); and to discard the region of the duct curve (36) from $(z/b)=(a/b)$ to $(z/b)=0.20$ and to discard the region of the charged aerosol curve from $(z/b)=(a/b)$ to $(z/b)=0.10$. In these regions, the curves diverge rapidly to a large value. For a duct entrance diameter $D_a=10$ mm; an orifice diameter of 3.7 mm may be used. This results in an increased flow rate, and heat/electric power conversion of about 1 KW, as set forth hereinafter. The 10 mm dia. straight duct meets the duct curve (36) at about $(z/b)=0.25$, as shown in FIG. 1. A short curved surface joins the inlet duct surface and converging duct surface.

6.7 Uncoupled Flow

For uncoupled flow the continuity equations (30) apply only to the gas in the duct but not to the charged aerosol. By "uncoupled flow" it is meant that the area exponent for the duct J and the area exponent for the charged aerosol, j, in general, have different values; but the gas and the charged aerosol, assumed to have a charged droplet of near zero mobility, are both subject to the same velocity gradient. This velocity gradient has a maximum value of $\eta \approx 1.5$, as established by equation (11). With these conditions, a power ratio of 50 is obtained for $\chi=1$ and 100 for $\chi=2$, according to (24) and (25).

FIG. 2 shows plots of the curve of the duct surface, and the curve of the charged aerosol surface; using J=−1.41 for the duct and employing the continuity equation (30), and with j=−0.65 for the curve of the charged aerosol surface. The equations were derived for $(b/a)=100$:

$$r_d = 1.85(z/b)^{-0.705} \quad (41)$$

$$r_a = 1.85(z/b)^{-0.325} \quad (42)$$

The velocity ratio curve of FIG. (2) is plotted from $$(U_z/U_b) = (z/b)^{1.5} \quad (43)$$

Referring to FIG. 2, power conversion starts at the maximum radius of the charged aerosol surface which is at $(z/b)=0.08$, near the entrance of the duct. The gas flow enters the converging duct at $(z/b)=0.25$, where it reaches the surface at a velocity ratio of 0.125. If the velocity at z=b is 86.5 m/s, then at $(z/b)=0.25$ the velocity.

6.8 Charged Aerosol Formation

Referring to FIGS. 1 and 2, a charged aerosol 10 is shown forming from a conductive liquid jet 7 and spreading within a cone to the entrance to the conversion space at z=a. An electric field is applied between the exciter electrode 8 and the liquid jet 7, by the exciter voltage source 9. As previously described[6] the liquid jet enters the gas stream at a greater temperature than the gas, the electric field causes the jet to break into many small charged droplets charged by induction, the gas is locally heated, and the charged mutually repel each other; and a sudden expansion occurs, causing an increase of the velocity of the charged aerosol, momentarily resulting in a large value of the velocity gradient exponential, n, in the vicinity of the apex of the cone at the liquid jet. Consider the equation (14) for the E field ratio $\zeta$ at z=a (for example z=0.01 mm at the liquid jet for a 10 mm diameter exciter ring 8); $(b/a)=100$ now taken between the jet and the exciter electrode and j=2 for a conical expansion of the charged aerosol. Equation (14) for the E field ratio is independent of j at z=a. Evaluating (14), it is shown that for a current ratio of $1/\zeta=50$, n=1.5 is required; and this value of n may be obtained by the sudden expansion of the charged aerosol as it is formed, as above described. The maximum voltage generated in the cone $\chi=0.0125$, calculated from (14) and (18), is very small, and is readily exceeded by the applied voltage between the exciter ring and the liquid jet 7, which results in large currents being drawn by the formation of the charged aerosol. Previous work has shown that the electric power expended in the formation of the charged aerosol is 0.1–1% of the output electric power.[7]

6.9 Isothermal Heat/Electric Power Conversion

The gas requires a time of about $t=L/U_{ave}=10^{-2}/50=2\times10^{-4}$ sec to traverse the conversion space. However, with the small diameter of the charged droplets (about 0.3 μm) the time for temperature equilibrium, is much less, about $3.5\times10^{-8}$ sec.[8] Hence to assure that the droplets deliver their heat content to the gas gradually along the conversion space, at the rate required by electric power conversion, it is preferred to have the gas and the charged aerosol droplets enter the conversion space at the same temperature. In this manner, as electric power is converted from the heat content of the charged aerosol gas along the conversion space, this heat power is provided by (1) the enthalpy heat power decrease of the gas as it cools by a temperature $\Delta T$; that is $$\Delta Q_1 = \dot{m}_g C_p \Delta T \quad (44)$$

and by (2) the change i heat power content $\Delta Q_2$ of liquid droplets:

$$\Delta Q_2 = \dot{m}_o C_o \Delta T = a\dot{m}_g C_o \Delta T \quad (45)$$

The temperature changes $\Delta T$ in (44) and (45) are equal and simultaneous. Hence the total heat power provided to the gas for the almost isothermal conversion to electric power is $$\Delta Q = \Delta Q_1 + \Delta Q_2 \quad (46)$$

The gas and the charged liquid droplets enter the conversion space at z=a at temperature $T_a$, and leave the conversion space at z=b at temperature $T_b$.

Since $$C_p = R\gamma/(\gamma - 1) = (8314/\Omega)[\gamma/(\gamma - 1)] \quad (46.1)$$

$$P_Q = \Delta Q = [\alpha C_o/R + \gamma/(\gamma - 1)]\dot{m}_g R \Delta T \quad (46.2)$$
$$\quad\quad\quad\quad\quad\quad ① \quad\quad\quad ②$$

in which ① is the heat provided by the cooling liquid droplets, and ② is the heat provided by the cooling gas.

The heat $\Delta Q$ provided to the gas is converted to electric power and to the kinetic power of the gas as it increases velocity. The kinetic power component is small compared to the electric power output. The temperature of the gas and the charged droplets decrease, and the gas pressure and density decrease. This provides the electric power and the kinetic power outputs from the converter space.

Because the gas and liquid droplets are introduced at the entrance to the conversion space, at the same temperature, in temperature equilibrium, the nearly isothermal heat/electric power conversion is independent of the droplet diameter. The droplet diameter and electric charge per droplet have values such as to provide optimum power transduction, the charged droplet having a small mobility in the electric field.

The expansion is polytropic, not ideally isothermal. As previously described[9] for a gas and a metal droplet which have a temperature decrease $\Delta T < < T$, the expansion is approximately isothermal; from (46.2):

$$\Delta Q = \dot{m}_g R T \ln(p_1/p_2) = \dot{m}_g R \Delta T \left[ \frac{\alpha C_o}{R} + \frac{\gamma}{\gamma - 1} \right] \quad (46.3)$$

$$\ln(p_1/p_2) = \left[ \frac{\alpha C_o}{R} + \frac{\gamma}{\gamma - 1} \right] \frac{\Delta T}{T} \quad (47)$$

Evaluating (47) for liquid metal tin droplet, and nitrogen gas, and assuming that the liquid droplet and gas heat contents are equal $$\alpha = (R/C_o)[\alpha/(\alpha - 1)] = \frac{8314}{28 \times 218.4} \times \frac{1.4}{0.4} = 4.76 \quad (48)$$

Putting these values into (47)

$$l\eta(p_1/p_2) = 7(\Delta T/T) \quad (49)$$

for $$(p_1/p_2) = 2.01;$$

$$l\eta 2.01 = 0.7$$

and $$(\Delta T/T) = 0.1 \quad (50)$$

Hence the heat/electric power conversion is approximately isothermal; thus for T=1800° K., $\Delta T$=180° K. For smaller pressure ratios $\Delta T$ is smaller; thus for $(p_1/p_2)$=1.5, $(\Delta T/T)$=0.06 and $\Delta T$=103° K.

It was previously shown[10] that the electric power converted in a charged aerosol is:

$$P_e = \tfrac{1}{2}\epsilon_o b_1^2 (b_g K_a)^2 \delta_r^2 U A \Gamma \quad (51)$$

This equation may be expressed in terms of the mass flow rate, $\dot{m}_g$ with important consequences:

In (51) multiply and divide through by the density $\delta$, and by R and make these substitutions:

$$\dot{m}_g = \delta A u \quad (52)$$

$$\delta = \frac{\Omega}{28.97} \delta_1 \delta_r \cdot \frac{273}{T}; \; \delta_r/\delta = \frac{1}{28.97}\left(\frac{\Omega}{\delta_1}\right)\frac{T}{273} \quad (53)$$

$$R = 8314/\Omega \quad (54)$$

Define as a constant:

$$K_e = \tfrac{1}{2}\epsilon_o b_1^2 28.97/\delta, 273 \times 8314 \quad (55)$$

$$K_e = \tfrac{1}{2} \times 8.854 \times 10^{-12} \times (3 \times 10^6)^2 \times 28.97/1.273 \times 2\text{-}73 \times 8314$$

$$K_e = 4.00 \times 10^{-4} \quad (56)$$

From (51)–(56) inclusive:

$$P_e = K_e(b_g K_a)^2 \dot{m}_g R T \delta_r \Gamma = 4 \times 10^{-4}(b_g K_a)^2 \dot{m}_g R T \delta_r \Gamma \quad (57)$$

The equation for electrothermodynamic power conversion is:

$$P_Q = \dot{m}_g R T \ln(\delta_1/\delta_2) = P_e + P_k \quad (58)$$

In (58), $P_e$ is the heat power converted to electric power; and $P_k$ is the heat power converted to kinetic power, and exhausted from the orifice at $(z/b)=1$. The change in kinetic power is:

$$P_k = \tfrac{1}{2}(\dot{m}_o + \dot{m}_g)(U_b^2 - U_a^2) \quad (59)$$

$$P_k = \eta_k \tfrac{1}{2}\dot{m}_g(1+\alpha)U_b^2 \quad (59.1)$$

where $\eta_k \approx 1$ since $$U_b >> U_a \quad (60)$$

The sonic velocity $U_s$ is given by:

$$U_s^2 = \gamma R T \quad (61)$$

For a charged aerosol gas, the sonic velocity is $U_s^1$ $$\tfrac{1}{2}(1+\alpha)\dot{m}_g U_s^{12} = \tfrac{1}{2}\dot{m}_g U_s^2 \quad (62)$$

Hence the sonic velocity of a charged aerosol gas is:

$$U_s^1 = (1/\sqrt{1+\alpha})U_s \quad (63)$$

in terms of the Mach No M:

$$U_b = M U_s^1 = (M/\sqrt{1+\alpha})U_s \quad (64)$$

From (59) to (64):

$$P_k = \eta_k \tfrac{1}{2}(1+\alpha)\dot{m}_g M^2[1/(1+\alpha)]\gamma R T \quad (64.1)$$

$P_k\delta_{\frac{1}{2}}\dot{m}_g RT\gamma M^2$; since $\eta_k \approx 1$ (65)

From (57), (58) and (65):

$$\dot{m}_g RT \ln(\delta_1/\delta_2) = K_e(b_g k_a)^2 \dot{m}_g RT\delta_r\Gamma + \tfrac{1}{2}\dot{m}_g RT\gamma M^2 \quad (66)$$

$$\ln(\delta_1/\delta_2) = K_e(b_g k_a)^2 \delta_r\Gamma + \tfrac{1}{2}\gamma M^2 \quad (66.1)$$

For $P_k$ to be negligible:

$$\tfrac{1}{2}\gamma M^2 << \ln(\delta_1/\delta_2) \quad (67)$$

if $(\delta_1/\delta_2) = 2$ and $\gamma = 1.4$:

$$\tfrac{1}{2}(1.4)M^2 << \ln 2 = 0.7$$

$$M^2 << 1 \quad (67.1)$$

Example:

$$M = 0.238 \; M^2 = 0.057 << 1 \quad (68)$$

$U_s = 865$ m/s @ 1800° K. for $N_2$ $\alpha = 4.65$

From (48) and (64)

$$U_b = (0.238/\sqrt{5.65})865 = 86.5 \, m/s \quad (68.1)$$

$$U_a = U_b/1000 = 0.0865 \, m/s \text{ at } (z/b) = 0.01 \quad (68.2)$$

The velocity at the entrance to the duct at $(z/b) = 0.2$ is, from (43):

$$U_z = 86.5(0.2)^{1.5} = 7.73 \, m/s \quad (69)$$

Subject to condition (67) the last term in (66) may be neglected; whereupon this important criterion results:

$$\delta_R\Gamma = [1/K_e(b_g k_a)^2] \ln(\delta_1/\delta_2) \quad (70)$$

Example:

Given: $\begin{cases} b_g k_a = 1 & \text{for air to about } 1000° \text{ K.} \\ K_e = 4 \times 10^{-4} & \text{from (56)} \\ (\delta_1/\delta_2) = 1.5 \end{cases}$ $$\delta_r\Gamma = [\tfrac{1}{4} \times 10^{-4} \times 1^2]\ln 1.5 = 1000 \quad (71)$$

The criterion (70) is satisfied for $\delta_r = 20; \; \Gamma = 50; \; \chi = 1$ or $$\delta_r = 10, \; \Gamma = 100 \; \chi = 2 \quad (72)$$

According to the criterion equation (70), the electric power output is dependent on the electric breakdown factor $(b_g k_a)^2$ which preferably is 1 or more. For air at ambient temperature $b_g k_a = 1$, but may be about 0.5 at 1800° K. As previously reported, certain additive gases will increase $b_g k_a$, and may be employed in the practice of this invention. Alternatively for smaller $b_g k_a$, a smaller pressure ratio will serve.

The increase in entropy due to electric power conversion is from (57):

$$\Delta S = S_a - S_b = (P_e/\dot{m}_g T) = K_e(b_g k_a)^2 R.\delta_r\Gamma j/kg \cdot °K. \quad (73)$$

The mass flow rate $m_g$ is controlled by the pressure ratio $\rho_1/\rho_2$ and the orifice diameter $D_b$ at $z=b$. The gas flow rate through the duct is subject to the continuity equation (41), which for a positive value of $\eta \approx 1.5$ in a converging flow with $(\rho_1/\rho_2) = 1.5$ within a duct results in a surface curve subject to the condition $$J = 0.09 - \eta, \quad (74)$$

and a radius $r_z$ varying according to an exponent $J/2$ in $(z/b)^{-0.705}$. This duct surface provides a velocity ratio at $(z/b)$ of $(U_z/U_b) = (Z/b)^{1/\eta}$ required for maximum conversion of the heat power to electric power. The charged aerosol occupies a volume within the duct having a different surface; following a surface subject to the condition $j + n = 0.84$; for which, from the equation (26), there is calculated a maximum power ratio of 50, for $\overline{\chi} = 1$. Thus the duct surface establishes an accelerating flow, and the charged aerosol surface a charge distribution such as to result in a maximum power ratio.

Example

Given gas:air, electric breakdown factor $b_g k_a = 1$ ambient or 0.5 at 1800° K. (75)

Sonic velocity at 1800 K.

$$U_s = (\gamma RT)^{\frac{1}{2}} = \left(1.4 \times \frac{8314}{2897} \times 1800\right)^{\frac{1}{2}} = 850 \, m/s. \quad (76)$$

Orifice velocity for $\alpha = 4.76$ $$U_b = 0.2 \, U_s' = 0.2 \times 850/(1 + 4.76)^{\frac{1}{2}} = 70.8 \, m/s \quad (77)$$

Gas density at orifice $$\delta = \Omega_r\delta_1 \frac{273}{T} \delta_r = 1 \times 1.273 \times \frac{273}{1800} \times 20 = 3.86 \, kg/m^3 \quad (78)$$

The mass flow rate takes into account the gas flow, which is decreased by the mass flow rate of the liquid tin. The area of orifice, for a diameter $D_a = 3.7 \times 10^{-3} m = 3.7$ mm $$A_b = (\pi/4)(3.7 \times 10^{-3})^2 = 1.075 \times 10^{-5} \, m^2 \quad (79)$$

$$\dot{m}_g = \delta_g A_b U_b = 3.86 \times 1.075 \times 10^{-5} \times 70.8 = 2.94 \times 10^{-3} kg/s \quad (80)$$

From (58) the electric power output is $$P_e = P_Q - P_k = \eta P_Q = \eta \dot{m}_g RT \ln(\rho_1/\rho_2) \quad (81)$$

for $\eta = 0.94$ and $(\rho_1/\rho_2) = 2.1$; that is, $$P_k = (1 - \eta)P_Q = 0.06 \, P_Q \quad (81.1)$$

$$P_e = 0.94 \times 2.94 \times 10^{-3} \times (8314/29) \times 1800 \ln 2 = 1059 \text{ watts} \quad (82)$$

Using the criterion (70) to find $\delta_r$:

$$\delta_r \Gamma^1 = [1/K_e(b_g k_a)^2] \ln(p_1/p_2) = [\tfrac{1}{4} \times 10^{-4} \times 1] \ln 2.1 = 1854 \quad (83)$$

For $\Gamma = 50$ (24)

$$\delta_r = 37 \quad (84)$$

For $\Gamma^1 = 100$ (25)

$$\delta_r = 18.5 \quad (85)$$

These require different values of j: for $\overline{\chi} = 1$ and $\overline{\chi} = 2$, $-0.635$ and $-0.85$ respectively; which implies that the charged aerosol surface curves vary. Such variation may be obtained by increasing or decreasing the exciter voltage, varying the load resistor (16), or the pressure ratio $p_1/p_2$.

The gas temperature increase decreases the electric breakdown factor $b_g k_a$. Thus if $b_g k_a = 0.5$ then the pressure ratio may be decreased; for example to 1.2 for the same value of $\delta_r$; but this will decrease the electric power output to $\tfrac{1}{4} \times 1059 = 264$ watts. Hence to maximize electric power output and efficiency, there is an optimum operating temperature, and a trade-off, which is an engineering decision.

6.10 Liquid Volume Flow Rate

The liquid mass flow rate is by definition:

$$\dot{m}_o = a\dot{m}_g \quad (86)$$

By continuity $$\dot{m}_o = \delta_o U_o A_o = \delta_o \dot{v}_o = a\dot{m}_g \quad (87)$$

$$\dot{v}_o = (a/\delta_o)\dot{m}_g \quad (88)$$

The mass flow rate of the gas is:

$$\dot{m}_g = \delta_g \dot{v}_g \quad (89)$$

The gas density is:

$$\delta_g = \Omega_r \delta_1 (273/T)\delta_r \quad (90)$$

The ratio $R_{og}$ of the liquid volume to the gas volume is:

$$R_{og} = \dot{v}_o/\dot{v}_g = (a/\delta_o)\dot{m}_g(\dot{m}_g/\delta_g) = a(\delta_g/\delta_o) \quad (91)$$

From (90) and (91):

$$R_{og} = [(\delta_1/\delta_o)\Omega_r 273](a\delta_r/T) \quad (92)$$

Example:
Find $R_{og}$ for the following conditions
$a = 4.76$ (from 48)
$\delta_1 = 1.273$ kg/m³ density of air at 1 atm and 273° K.
$\delta_o = 5750$ kg/m³ liquid tin
$\Omega_r = 28/28.97$ for $N_2$ relative to air rel. mol wt
$\delta_r = 20$
$T = 1800$ K.
Solution: from (92)

$$R_{og} = [(1.273/5750)(28/28.97)273](4.76 \times 20/1800) = 3.08 \times 10^{-3} \quad (93)$$

That is, the volume ratio of liquid tin to $N_2$ is about 3/1000 but the mass ratio is 4.76.

6.11 Area and Diameter of the Liquid Jet Orifice $$A_o = \dot{m}_o/\delta_o U_o = a\dot{m}_g/\delta_o U \quad (94)$$

Example: Given $$\dot{m}_g = 2.94 \times 10^{-3} Kg/S \text{ from} \quad (80)$$

$$a = 4.76 \text{ from} \quad (48)$$

$$U_o = 10 \text{ m/s from} \quad (9)$$

$$A_o = 4.76 \times 2.94 \times 10^{-3}/5750 \times 10 = 2.4 \times 10^{-7} m^2 \quad (95)$$

6.12 Jet Power Input $$P_o = \tfrac{1}{2} \dot{m}_o U_o = \tfrac{1}{2} a\dot{m}_g U_o^2 = \tfrac{1}{2} \times 4.76 \times 2.74 \times 10^{-3} \times 10^2 \quad (96)$$

$$P_o = 0.70 \text{ watts} \quad (97)$$

6.13 Droplet Diameter and Electric Charge

For optimum mobility[11].

$$N_e = \overset{m}{d_o}/100 = d_o \times \overset{\text{Å}}{10^{10}}/100 = \overset{m}{10^8} d_o \quad (98)$$

That is, there should be electron for each 100 Å Dia of the droplet.

$$\dot{N} = \dot{m}_o/(\pi/6)d_o^3 \cdot \delta_o = a\dot{m}_g/(\pi/6)d_o^3 \delta_o \quad (99)$$

$$I = \dot{N} N_e e = [a\dot{m}_g/(\pi/6)d_o^3 \delta_a][10^8 d_o]e \quad (100)$$

$$I = [(6/\pi)10^8 e/\delta_a][a\dot{m}_g/d_o^2] = 5.32 \times 10^{-15}(a\dot{m}_g/d_o^2) \quad (101)$$

$$d_o = 7.29 \times 10^{-8}(a\dot{m}_g/I)^{\frac{1}{2}} \quad (102)$$

Example: Given $$P_e = 1059 \text{ watts} \quad (82)$$

$$V = 10^5 \text{ volts}$$

$$I = P/V = 1059/10^5 = 1.059 \times 10^{-3} \text{ amps}$$

$$a = 4.76 \quad (48)$$

$$\dot{m}_g = 2.94 \times 10^{-3} kg/s \quad (80)$$

Find: The droplet dia. $d_o$. From (102):

$$d_o = 7.29 \times 10^{-8}(4.76 \times 2.94 \times 10^{-3}/1.059 \times 10^{-3})^{\frac{1}{2}} = 0.27 \times 10^{-6} m$$

$$d_o = 0.27 \mu m \quad (103)$$

From (98):

$$N_e = 0.27 \times 10^{-6} \times 10^8 = 27 \text{ electrons/droplet} \quad (104)$$

7. The Generator

Figure 3:
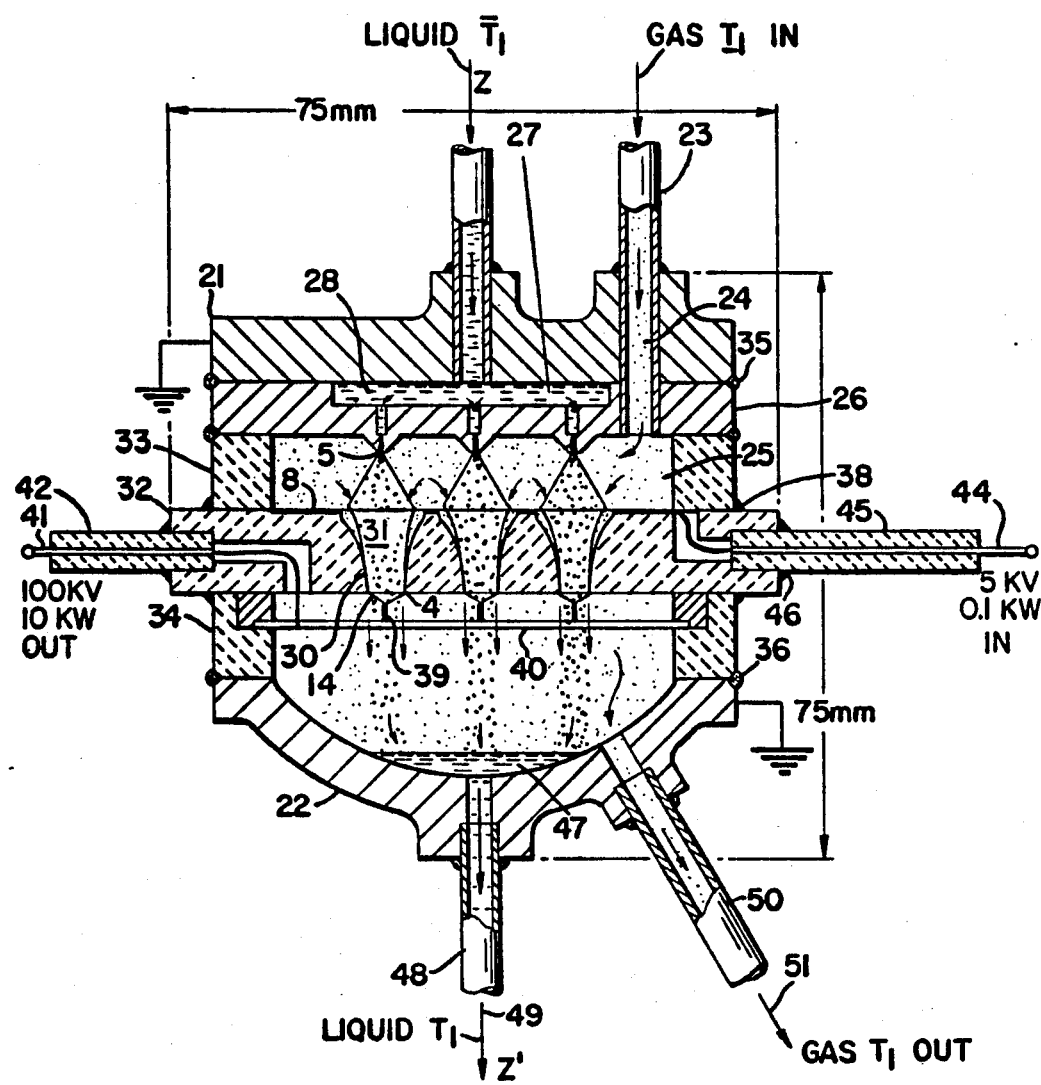
FIG. 3 shows a cross sectional view of an electrothermodynamic generator of this invention comprising a 9 element array.

FIG. 3 shows a cross-sectional view of an electrothermodynamic generator of this invention full scale, comprising a 9 element array on the vertical axis. Each element generates about 1100 Watts; the total output being about 10 KW at 100,000 volts and 0.1 amp. D.C. The generator is one component in a Marks/Ericsson Cycle previously described.[12] It is maintained at its operating temperature T; for example 1800° K. within a heated enclosure, or furnace. The discussion relates to the generator, only.

The generator comprises two stainless steel end plates 21 and 22 which are at ground potential. An inlet pipe 23 supplies a gas; for example, air, nitrogen, or other suitable gas or mixture of gases[13] through the entrance port 24 of the end plate 21 to a common chamber 25 in which the gas is temporarily held under a suitable supply pressure, for example 120 atmospheres and at T.=1800° K. The end plate 21 is welded to an intermediate plate 26, which contains a chamber 27 between the two plates. The chamber 27 receives the conductive liquid 28, which enters the chamber at a temperature $\overline{T}_1$; for example 2400 K., and at a pump pressure of for example 130 atmospheres.

The end plates may be fastened together by screws to hold all the members including the insulating discs, 32, 33, and 34 under compression. This has not been illustrated herein for simplicity, but will be well understood by those skilled in engineering design.

The electrothermodynamic power conversion occurs in the ducts $30^a$, $30^b$, $30^c$, etc.; which contain charged aerosols $31^a$, $31^b$, $31^c$ etc located within the duct surfaces, separated therefrom, and operating as uncoupled flows, as particularly described in Section 6.7 herein. The ducts 30 are preferably formed in a 10 mm thick sapphire plate 32. Sapphire is the best insulator, and non-reactive material suitable for these temperatures. For generators operating at lower temperatures other materials such as quartz may be used instead. Insulating spacer discs 33 and 34 may be joined to the plate 32; by suitable joints 37 and 38; and to the metal plates 22 and 26. Such joints have been described[14']. The charged aerosols 31 are discharged by ions of opposite sign 4, emitted from points $39^a$, $39^b$, $39^c$, etc. which are mounted on an open mesh metal screen 40 held in place between elements 32 and 34. Since large voltages are involved the 100K lead 41 is passed through an insulating tube 42, which is sealed at 43 into a hole drilled in the side of plate 32. Similarly the exciter electrode 8, which is a conductive metal film shown in FIG. 2, on the entrance face of the insulating disc 32 is connected to the lead 44, which is brought out through the insulating tube 45, sealed to a second hole in disc 32, at 46.

After the charged aerosol is discharged by the points 39 the neutral droplets no longer repel each other, and coalesce into the liquid pool 47, which is withdrawn through the tube 48, as liquid flow 49, which is circulated through the liquid pump and heating coils back to the generator at 28, as previously described.[15]

The gas enters the generator at pressure $p_1$ and temperature $T_a \approx T_1$ through tube 23 in end plate 24; and exits through tube 50 as a gas stream, now separated from the liquid, at pressure $p_2$ and temperature $T_b$. For example $(p_1/p_2)=1.5$ or 2 and $(T_a-T_b)=\Delta T$ 180 to 100K $[\Delta T/T_1=(180/1800)=0.1]$ at 1800° K. Each duct may produce about 1100 watts (82); that is a total of about 10 WK for the 9 elements contained within the volume of a 7.5 cm cube.

In the practice of this invention, as described herein there may be employed a variety of gas and conductive liquids, each chosen for the selected ranges of temperature and pressure.

The gas may be selected from air, nitrogen, oxygen, hydrogen, helium and the other monoatomic gases; and compound gases such as the fluorocarbons, sulfur hexafluoride. Electron absorbing gases such as chlorine and carbon tetrachloride may be used to increase the electric breakdown strength of the gases, as previously described.[13]

The conductive liquids which may be employed include water, ethyl and the higher alcohols, various other organic fluids, and metals such as tin, mercury, gallium, metal compositions such as Woods Metal, Gallium-Niobium.

The objective is to obtain a liquid nonevaporating droplet in an inert gas having a higher breakdown strength, which is nonreactive with the materials, and stable at the maximum operating temperature chosen. With a high breakdown strength gas, the operating pressure is decreased.

The electrothermodynamic system with the equations and configurations (Section 6.9) hereinabove described, is substantially reversible, and may be advantageously employed by an ETD Compressor with charged water droplets in a Marks/Ericsson Cycle previously described.[10]

As above described, the gas and the charged aerosol are formed and enter the compressor at $z=a$, and discharge at $z=b$; with the velocity U increase from $z=a$ to $z=b$ with the velocity exponent n. However, in the compressor, the voltage is applied from $z=a$ to $z=b$, such that $V=\overline{V}$ at $z=a$ and $V=0$ at $z=b$, and the electric field intensity is reversed, so that electric power is supplied to the charged aerosol gas, to increase its pressure from $p_2$ to $p_1$, and increase its kinetic power. The gas-charged aerosol almost isothermally absorbs the electric power, and converts it to heat power to the charged water droplets, which serve as the heat-sink of the system at 300 K. The input electric power to the ETD Compressor supplies power to compress the charged aerosol gas from $p_2$ to $p_1$ while it is being cooled isothermally by the charged water droplets, and also to increase the velocity and kinetic power of the charged aerosol gas; which as in the ETD Generator is a small fraction of the electric power supplied to the compressor. After discharge, the liquid water is collected and sent to the water heat-sink heat exchanger.

The gas supplied to the ETD Compressor at pressure $p_2$ is supplied from the heat exchanger. Since its absolute temperature has decreased by the ratio $1800/300=6$; the density is decreased by this factor. The isothermal work done on the gas is also decreased by this factor. Consequently if the ETD Generator has 12 modules producing 12 KW at 1800° K., the compressor then has only 2 modules, using 2 KW, and is very compact, in the same proportion.

This design is illustrative, and may be varied according to design specifications by those skilled in the art. Various modifications may be made herein without departing from the scope of this invention; for example, the D.C. output may be inverted to 60 HZ AC for general utility.

REFERENCES

1. U.S. Pat. No. 4,395,648 issued July 26, 1983 to Alvin M. Marks. For background see Cols. 2-8 inclusive and for the Bibliography see Cols 51 and 52
2. ibid: Method III Cols 31-44 inclusive
   2.1 ETD Converter With Conical Jet CIP of 1. Copending Case Ser. No. 479,986 filed Mar. 29, 1983.
3. ibid: Col. 32 Equ (122) and Col. 34 Equ (145)
4. ibid: Col. 52 reference 7 also see Col. 4 lines 10-30
5. ibid: 4
6. ibid: Col. 44 lines 63-68
7. ibid: Bottom Col. 4, top Col. 5
8. ibid: Col. 48 Equ (220)
9. ibid: Cols. 46-47

10. ibid: Col. 34 Eq. (145)
11. ibid Col. 52 Refs. 7, 26
12. ibid Cols. 44, 45 FIGS. 26, 28–30 incl.; Cols. 46–51 incl.
13. ibid Col. 52 Ref. 7 Cols 21–22 Table No. 1.
14. ibid Col. 11 lines 38–48 inclusive Note: other materials may be plasma sprayed, and a higher temperature braze metal may be employed for the 1800–2400 K. range
15. ibid Col. 46, FIG. 28.

Having fully described my invention, what I wish to claim is:

1. In an electrothermodynamic generator for the substantially isothermal conversion of the internal heat power of a flowing gas charged aerosol to electric power, a source of gas, said gas entering said generator at a temperature $T_1$ and pressure $p_1$ a gas source, a duct connected to said gas source, said duct having a flow axis in the Z direction, said duct converging from an entrance diameter $D_a$ at Z=a to an exit orifice in said duct having a diameter $D_b$ at Z=b, a source of conductive liquid at a pressure and temperature exceeding that of the said gas, a minor orifice for said liquid located on said axis upstream from said duct entrance, said conductive liquid issuing as a jet from said minor orifice, an exciter electrode located at the said duct entrance, an exciter electric potential source, said potential source being connected across said conductive liquid and said exciter electrode to cause a charged aerosol droplets to form from said liquid jet between said minor orifice and said exciter electrode, a discharge electrode located downstream from the said exit orifice, which injects ions of opposite sign into said charged aerosol, the heat content of said charged aerosol droplets being at least equal to the heat content of the gas in which it is contained, constituting an internal heat source to maintain the charged aerosol gas at nearly constant temperature, said converging duct causing the velocity and kinetic power of said gas-charged aerosol to increase as it moves along the flow axis from Z=a to Z=b; said gas decreasing in pressure from $\rho_1$ at Z=a to $\rho_2$ at Z=b, the ratio of temperature decrease $\Delta T$ to the absolute temperature $T_1$ being less than about 0.1, whereby the charged aerosol gas almost isothermally converts its heat power to electric power, said kinetic power being a small fraction of said electric power; a load resistor, said load resistor being connected between said discharge electrode and said conductive liquid source, said electric power being delivered to said load.

2. An electrothermodynamic generator according to claim 1, in which said charged aerosol lies on an inner surface inside the gas flowing in the duct, and separated therefrom, except in the vicinity of the exit orifice, a velocity gradient established by said gas flowing in said duct establishing the said velocity gradient being the same for the said gas and said charged aerosol, but the spatial distribution of the electric charge density of said aerosol being determined by its said inner surface, whereby a current and power outputs are increased at a given operating voltage.

3. An electrothermodynamic generator according to claim 2 in which the velocity exponent n has a value of about 1.5, and in which the area exponent of the duct is about $J=-1.41$ governed by continuity, and in which the area exponent of the charged aerosol is about $j=-0.65$.

4. An electrothermodynamic generator according to claim 2 in which the curve of the duct surface has the equation:

$$r_d=1.85(z/b)^{-0.705}$$

and in which the curve of the charged aerosol surface has the equation:

$$r_a=1.85(z/b)^{-0.325}.$$

5. An electrothermodynamic generator according to claim 1 in which the said gas flowing in said duct is electrically uncoupled said charged aerosol flow being separated from the walls of said duct.

6. An electrothermodynamic generator according to claim 1, an insulating disc and an array of said converging ducts formed in said insulating disc, whereby a multiplicity of said generators are connected in parallel to increase the electric power output.

7. An electrothermodynamic generator according to claim 1, said generator being incorporated in a Marks/-Ericsson Cycle.

8. In an electrothermodynamic generator according to claim 1, a conductive liquid chosen from the class consisting of water, alcohol and a liquid metal including tin, Woods Metal, mercury, gallium, gallium-noibium.

9. In an electrothermodynamic generator according to claim 1, a gas selected from the class consisting of air, oxygen, nitrogen, hydrogen, and other monoatomic gases.

10. In an electrothermodynamic generator according to claim 9, said gas containing additives to increase electric breakdown strength selected from the class consisting of fluorocarbons, sulfur hexafluoride, chlorine, carbon tetrachloride.

11. In an electrothermodynamic generator according to claim 2, in which the said charged aerosol has a spatial charge distribution along said flow axis providing an electric potential along the said flow axis having a substantially decreased electric field intensity everywhere along said axis, thereby enabling an increase in the electric current and electric power output by several orders of magnitude, with substantially no increase in the output voltage.

12. A method for the substantially isothermal electrothermodynamic conversion of the internal heat-power of a flowing charged aerosol gas to electric power, which comprises the steps of providing a gas at a temperature $T_a$ and pressure $\rho_a$, confining said flowing charged aerosol gas within a converging duct, said duct having a flow axis ZZ', providing a conductive liquid at a pressure temperature exceeding that of said gas, causing said liquid to flow through a minor orifice to form a conductive liquid jet upstream from said duct entrance, an exciter electrode at the entrance to said duct, applying an electric field between said exciter electrode and said jet, forming charged aerosol droplets in said flowing gas stream, said charged aerosol droplets having a mass flow rate $\dot{M}_g$, said flowing gas having a mass flow ratio $\alpha$, the ratio $\alpha=\dot{m}_o/\dot{m}_g$ being such that the heat content of the said liquid droplets at least exceeds that of the said gas; the heat contents of said liquid droplets and the said gas constituting an internal heat source, passing said charged aerosol through the said converging duct from Z=a to Z=b on said axis respectively at the entrance and the orifice at the exit of the said duct, causing the said gas to decrease in temperature and pressure from $T_a$ and $\rho_a$ at $Z=a$ to $T_b$ and $\rho_b$ at $Z=b$ respectively, the value of $\Delta T/T$ being less than about 0.1 to obtain substantially isothermal operation, where $\Delta T = T_a - T_b$; increasing the velocity and kinetic power of the gas, and converting the difference between said heat power and kinetic power to electrical power, discharging said charged aerosol at the orifice of said duct by spraying said charged aerosol with ions of opposite polarity from a collector electrode, said kinetic power being a small proportion of said electric power, delivering said electric power to an electrical load.

13. A method for the substantially isothermal electrothermodynamic conversion of the internal heat power of a flowing charged aerosol gas according to claim 12, in which the charged aerosol flows along a surface within the duct surface which have a common exit diameter at $z=b$; in which the flowing gas establishes a common increasing velocity space gradient, and in which the charged aerosol surface establishes the charge distribution to obtain a large power ratio of the order of 50 to 100.

14. As an article of manufacture, an electrothermodynamic power converter comprising a first end plate, an inner chamber in said end plate, a gas inlet connection, and liquid inlet connection in said first end plate, a plurality of minor orifices in said end plate communicating with said inner chamber and said liquid inlet, a central insulating plate containing a plurality of converging ducts in an array, first and second insulating spacers, an exciter electrode comprising a conductive metal film as the first surface of the said insulating plate, a plurality of discharge points on a supporting screen mounted between said second surface of said insulating space and said second spacer, a second end plate, liquid and gas outlet connection in said second plate, said first end plate, first insulating spacer, insulating plate, second insulating spacer, and second end plate being mounted and sealed together to form a pressure-containing vessel; a first major chamber between said first end plate and said first surface of said insulating plate to receive the gas and provide space for the formation of the charged aerosol from the plurality of liquid jets from said minor orifices, and a second major chamber between the second surface of said insulating plate and said second end plate, to provide space to receive the discharged aerodol droplet from the gas, and to provide a liquid pool to receive and coalesce the said discharged liquid droplets, and to exhaust the gas through its outlet; a first insulated tube containing the high voltage outlet lead, sealed to the side of said plate, said outlet lead being connected to said discharge electrodes; and a second insulated tube containing the high voltage exciter lead, said exciter lead being connected to the conducting layer on the inner face of said insulating plate.

15. An article of manufacture according to claim 14 in which said end plates compress the said insulating plate and spacers.

16. An article of manufacture according to claim 14, said article being incorporated in a Marks/Ericsson Cycle.

17. In a Marks/Ericsson Cycle according to claim 7, an electrothermodynamic compressor for the substantially isothermal compression of a flowing charged aerosol-gas at a temperature $T_2$ from pressure $p_2$ to pressure $p_1$, a gas source, a duct connected to said gas source, a source of electric power, said duct having a flow axis in the z direction, said duct converging from an entrance diameter $D_a$ at $z=a$, to an exit diameter in said duct having a diameter $D_b$ at $z=b$, a source of conductive liquid at a pressure exceeding that of the gas, a minor orifice for said liquid located on said axis upstream from said duct entrance, said conductive liquid issuing as a jet from said minor orifice, an exciter electrode located at the said duct entrance, an exciter electric potential source, said potential source being connected across said conductive liquid and said exciter electrode to cause charged aerosol droplets to form from said liquid jet between said minor orifice and said exciter electrode, the heat content of said charged aerosol droplets being at least equal to the heat content of the gas in which it is contained, constituting an internal heat-sink to maintain the charged aerosol gas at a nearly constant temperature, said converging duct causing the velocity and kinetic power of said charged aerosol gas to increase as it moves along the flow axis from $z=a$ to $z=b$, said gas increasing in pressure from $p_2$ at $z=a$ to $p_1$ at $z=b$, the ratio of temperature increase $\Delta T$ to the absolute temperature $T_2$ being less than about 0.1, a discharge electrode at said duct exit to discharge said aerosol by ions of opposite electric sign thereto, said electric power source being connected between said conductive liquid and said discharge electrode, whereby said charged aerosol almost isothermally converts the said electric power to said increase in pressure and kinetic power of said flowing gas, a heat-sink heat exchanger, said discharged droplets being collected and supplied to said heat-sink heat exchanger.

18. In an ETD compressor according to claim 17, charged aerosol droplets comprising water liquid.

* * * * *